United States Patent [19]

Garriott et al.

[11] Patent Number: 5,228,644
[45] Date of Patent: Jul. 20, 1993

[54] SOLAR POWERED SYSTEM FOR A SPACE VEHICLE

[75] Inventors: Owen K. Garriott, Huntsville, Ala.; Thomas J. Harvey, Lompoc; Philip A. Jones, Santa Barbara, both of Calif.

[73] Assignee: The United States of America as represented by the United States National Aeronautics and Space Administration, Washington, D.C.

[21] Appl. No.: 705,807

[22] Filed: May 28, 1991

[51] Int. Cl.$^5$ .............................................. B64G 1/44
[52] U.S. Cl. ................................. 244/173; 244/158 R
[58] Field of Search ........................... 244/173, 158 R

[56] References Cited

U.S. PATENT DOCUMENTS

| | | |
|---|---|---|
| 3,460,992 | 8/1969 | Avilov et al. |
| 3,635,425 | 1/1972 | Swet .................................. 244/173 |
| 3,735,943 | 5/1973 | Fayet . |
| 3,785,590 | 1/1974 | Wentworth . |
| 4,076,191 | 2/1978 | Binge .................................. 244/173 |
| 4,133,501 | 1/1979 | Pentlicki . |
| 4,133,502 | 1/1979 | Anchutin ........................... 244/173 |
| 4,155,524 | 5/1979 | Marello et al. |
| 4,262,867 | 4/1981 | Piening . |
| 4,282,394 | 8/1981 | Lackey et al. |
| 4,373,690 | 2/1983 | Stillman et al. |
| 4,374,579 | 2/1983 | Renner et al. |
| 4,380,013 | 4/1983 | Slysh . |
| 4,384,163 | 5/1983 | Rauschenbach et al. |
| 4,384,692 | 5/1983 | Preukschat . |
| 4,393,541 | 7/1983 | Hujsak et al. |
| 4,395,004 | 7/1983 | Ganssle et al. |
| 4,426,052 | 1/1984 | Hubert et al. |
| 4,480,415 | 11/1984 | Truss . |
| 4,508,297 | 4/1985 | Mouilhayrat et al. |
| 4,630,791 | 12/1986 | Chapman . |
| 4,728,061 | 3/1986 | Johnson et al. |
| 4,732,354 | 3/1988 | Lievre . |
| 4,747,567 | 5/1988 | Johnson et al. |
| 4,834,325 | 5/1989 | Faget et al. |

OTHER PUBLICATIONS

Kapustka and Lanier, Jr., "A Programmable Power Processor for a 25 KW Power Module", PESC '78 Record, (Jun. 13–15, 1978).
Brochure of AEC-ABLE Engineering Company, Inc. entitled "FAST Mast" (date unknown).
Brochure of AEC-ABLE Engineering Company, Inc. entitled "Automatically Deployable ABLE Booms" (date unknown).
Chemical & Engineering News, Apr. 1, 1991 (pp. 5 and 6).
The Washington Post, "Redesign Space Called Unfit for Science", A1 and A16, Mar. 15, 1991.

Primary Examiner—Charles A. Marmor
Assistant Examiner—Carla Mattix
Attorney, Agent, or Firm—Beveridge, DeGrandi & Weilacher

[57] ABSTRACT

A solar power system for use with a space vehicle for achieving extended mission duration is disclosed. The solar power system includes sets of foldable solar panel casings which are unfolded and extended to the starboard and port sides (±Y axis) of the space vehicle. During stowage the laterally offset sets of casings are placed in an overlapping arrangement to reduce the lateral space occupied within the payload bay of the host space vehicle. The casings are further extended away from the space vehicle by extending an extendable boom along the ±Y axis. The extendable boom preferably includes a first and second boom section rotatably attached at their inboard end of the support structure. The solar panels contained within the casings are extended in a ±Z axis and a hinge is provided between the ends of the boom sections ad the casings such that the deployed panels can rotate about the ±Z axis. A pitch drive motor rotates the boom sections about the ±Y axis.

29 Claims, 11 Drawing Sheets

LOCAL VERTICAL (AIRPLANE) ATTITUDE

EARTH

SOLAR POWERED SYSTEM FOR A SPACE VEHICLE

FIELD OF THE INVENTION

The present invention relates to a solar power system used as a method of generating electricity for a space vehicle such as the space Shuttle.

BACKGROUND OF THE INVENTION

Presently, the Space Shuttle Orbiters derive electrical energy from "fuel cells" which chemically combine oxygen and hydrogen to produce electricity. Fours sets of cryogenic storage tanks containing the oxygen and hydrogen reactants are normally expended in about eight days at typical power usage levels.

To extend the duration of an Orbiter mission for more than eight days, it is possible to utilize additional storage tanks. Indeed, Columbia (OV102) sometimes carries a fifth tank set to extend the mission by about two days. For longer durations, it becomes necessary to carry even larger amounts of reactants for the fuel cells in the payload bay (approximately 400 lbm/day of flight extension). An additional pallet of four tank sets could be used to increase the mission duration from 8 to 16 days. The pallet containing the four tank sets, however, adds a mass of about 9000 lb which reduces the weight of the payload that can be lifted into orbit. The weight of the storage tank sets are such that extended durations beyond two weeks may not be practical due to the weight of the storage tanks required for such a mission.

Furthermore, the combination of these reactants contained in the storage tanks is a highly combustible mixture. A significant safety concern is thus raised whenever large quantities of the reactants are carried in the payload bay, especially during launch.

An earlier conceptual design of providing the Orbiter with electricity derived from solar energy was called a Power Extension Package (PEP). The PEP featured a solar array package and was carried into space on a pallet in the Orbiter payload bay. The "Remote Manipulator System" (RMS) was then used to grapple the array, lift it out of the payload bay and allow the array to unfold. The array had articulating joints permitting the Orbiter to assume any arbitrary attitude while the PEP remained pointing at the sun.

There are several disadvantages inherent in this PEP system. It requires the RMS to lift the PEP out into space and to maintain it perpendicular to the sun. To achieve the perpendicular relationship, three articulation joints had to be adjusted and readjusted upon any shift in Orbiter attitude. Power transfer took place across all of the rotating joints, which in turn necessitated complicated wiring systems. The required use of the RMS, which is not carried on most missions, added weight to the Orbiter and complexity to the mission. These factors had a very significant impact on mission cost.

In addition, PEP motion could subject the Orbiter to acceleration forces which would degrade microgravity conditions. This had the potential effect of interfering with microgravity experiments or manufacturing processes being conducted.

U.S. Pat. No. 4,630,791 illustrates a space-based solar operated power module which also relies on the RMS to deploy, meaning that it also produced many of the same disadvantages as the PEP.

Moreover, the extension of the solar panel mounting tubes in U.S. Pat. No. 4,630,791 longitudinally along the length of the Orbiter's payload bay has a highly limiting effect on the size of the cargo which can be stowed. The stowing of the solar panel mounting tubes longitudinally along the payload bay can also lead to problems of entanglement between the mounting tubes and various cargo structures stowed in the cargo bay.

SUMMARY OF THE INVENTION

The purpose of this invention is to provide electrical power to the Space Shuttle/Orbiter, derived from photovoltaic arrays, which will permit the Orbiter to fly extended duration missions of 30 days or more. The power system will utilize the solar cells and batteries in such a way as to provide the maximum level of reliability and safety. During this extended mission, the preferred orientation or attitude of the Orbiter is a "local-vertical" attitude defined as an attitude in which the Orbiter coordinate directions remain fixed with respect to the "local-vertical" or zenith-nadir directions. Among a variety of possible "local-vertical" attitudes, it is preferred that the x-axis is horizontal (nose or tail pointing in the velocity direction), and the payload bay direction ($-z$ is either in the zenith or nadir direction. In any local-vertical attitude, the Orbiter maintains a constant inertial coordinate rotation rate. In the preferred attitude the entire payload bay is maintained in nearly "0-g" or weightless condition, free from almost all gravity gradient forces.

The solar panels of the present invention are stowed during launch and reentry within casings which are supported by a truss-like structure in the Orbiter payload bay. When the payload bay doors are open, the solar panel arrays, while remaining folded within the casings, are extended on booms which protrude beyond the Orbiter wings (y—y direction). The solar panel arrays are then deployed such that the panels unfold like an accordion in a direction perpendicular to the boom. In achieving full deployment of the solar panel arrays an RMS is not required. It is only after the casings for the arrays have fully extended beyond the wings of the Orbiter that the panels are deployed from their casings in a direction perpendicular to the y—y axis of the boom.

With the Orbiter in the preferential local vertical attitude, the solar arrays can then be rotated about the (y—y) axis to track the sun in a "solar inertial" attitude. The arrays are fixed in inertial coordinates, but counter-rotate in Orbiter coordinates at the pitch rate of the Orbiter. The deployed solar panel arrays continue in steady state rotation until it becomes necessary to unwind the cables during orbital night time. An additional "beta-angle" hinge on the array boom allows the arrays to be tilted to point directly at the sun. The angle of tilt of the array panels is the same as that which a line to the sun makes with the (x-z) orbital plane, and is usually referred to as the "beta-angle".

To prevent the cables from winding up tightly, the rotation about the (y—y) axis, or "alpha rotation" is reversed on the night side of each orbit. For example, for about 240° of orbital travel the arrays track the sun. Then, at night, their rotation is reversed for 120° of orbital travel, to return to their original orientation. No rewind of beta-rotation is required, since this motion is not continuous, but naturally reverses in a sinusoidal fashion over many days.

An advantage of the present invention's design is that power is transferred by flexible cable across the rotating (y—y) boom and tilted arrays. This avoids high power transfer across rotating "alpha- and beta-joints" (slip rings), as is required in the present Space Station Freedom (SSF) designs.

Since torque about the (y—y) axis is required to reorient the solar panels and unwind the power cables, a variable speed momentum wheel is mounted on the truss-like support structure. The momentum wheel's angular acceleration (and therefore speed of rotation) is driven to offset any torque required to re-orient the solar panels and also to place the Orbiter pitch axis in the desired attitude. The Orbiter pitch attitude can be trimmed to null average disturbance torques such that changes in the angular momentum about the y—y axis of the Orbiter are cyclic and can be contained within the speed limitation of the momentum wheel. However, should the maximum permitted speed of the momentum wheel ever be reached, it can be "desaturated" by appropriate firing of the small pitch axis vernier RCS thrusters.

The truss-like support structure of the present invention also carries rechargeable batteries to be charged on the sunlit side of each orbit and discharged at night to supply the Orbiter power. These same batteries can be used for initial deployment of the solar arrays. Power distribution and regulation is provided by the appropriate control devices which include the capability to operate when the array is partially shadowed. The power system is designed for full sunlit power of 40 kW from the array and 18 kW delivered continuously to the Orbiter throughout a full orbit. Therefore, 22 kW is available from the arrays for approximately 60% of the orbit, for battery charging and other losses. Power system heat dissipation is accomplished either passively or by connection to the Orbiter heat rejection loops, or by cooling means such as a freon coolant loop supported by the truss-like structure.

The battery subsystem contains approximately 20 kW-hours of electrical energy. It should be noted that this is sufficient energy to support all essential Orbiter tasks required to retract/jettison all arrays, close payload bay doors, de-orbit and land the Orbiter. The present invention can thus provide adequate electrical energy in case of complete failure of all Orbiter fuel cells so as to allow for safe return of the Orbiter.

The design of the present invention provides solar arrays which articulate in two degrees of freedom, solar panel storage in the form of foldable blankets in protective casings, means for deploying and retracting the solar panels which includes a coilable mast activated by a deployment motor, rotatable and extendible booms with extension motor, a boom rotation motor, a tilt or betadrive motor, batteries, a shunting unit for control of solar power, a micro-processor based control unit, a momentum wheel, a thermal control unit possibly consisting of cold plates and a Freon pump package, flexible cables, a pedestal, and a support structure. The support structure-upon which are mounted the thermal control system, momentum wheel, batteries, battery chargers, regulators, and a system control unit- is attached to the host vehicle. The system control unit interfaces with the host vehicle to receive inertial reference information, and commands to deploy or stow, to access or turn off the power, to provide momentum wheel speed control, and to jettison the array in an emergency. It in turn sends to the Orbiter: voltage, current, battery status, temperature, and array position data. The remainder of the system is self-contained.

Upon command, the system deploys autonomously as follows: the boom is extended; the casings are opened (the panels themselves remaining folded or coiled); the coilable mast deploys the solar panels much like the opening of an accordion. The panels are then rotated in pitch and tilted by a motor driven beta angle hinge to be perpendicular to the line of sight to the sun; and the system starts generating power. The pitch motor causes the array to achieve the appropriate angular rate to remain oriented toward the sun. Assuming that the host vehicle maintains the preferential local vertical orientation, and its x and z axes are in the plane of rotation, the array will remain oriented toward the sun during the daylight portion of the orbit. When the satellite passes into the earth's shadow the pitch motor reverses its rotation to unwind the cable, and resets the array so that it will again be pointed at the sun at sunrise. Each time the pitch motor imparts angular momentum to the array, the momentum wheel is accelerated in the opposite direction by the amount necessary to exactly balance the momentum of the array rotation.

In preparation for reentry the Orbiter will command the array to be retracted and stowed in reverse order from the deployment. Should any difficulty occur that precludes safe stowage, provision has been made for EVA to assist retraction or, as a last resort, jettisoning that part of the system that would prevent closing the payload bay doors.

Finally, the system can provide for pitch axis attitude stabilization of the Orbiter itself. If it is desired to adjust the Orbiter pitch axis, the momentum wheel can be accelerated in either direction, resulting in the opposite rotation of the vehicle.

All of this is accomplished by a unique combination of light weight autonomous deployment mechanisms, a simple means of maintaining sun-array orientation, a power generation and storage system, and a momentum wheel. The result is an efficient, low cost, non-intrusive means of generating power in space, a more efficient utilization of the host vehicle attitude control system, and better maintenance of the desired microgravity state.

Although the following discussion is made in reference to a preferred use of the present invention with an Orbiter, the present invention is also adaptable to other designs of space vehicles.

DETAILED DESCRIPTION OF THE PREFERRED EMBODIMENTS

Figure 1:
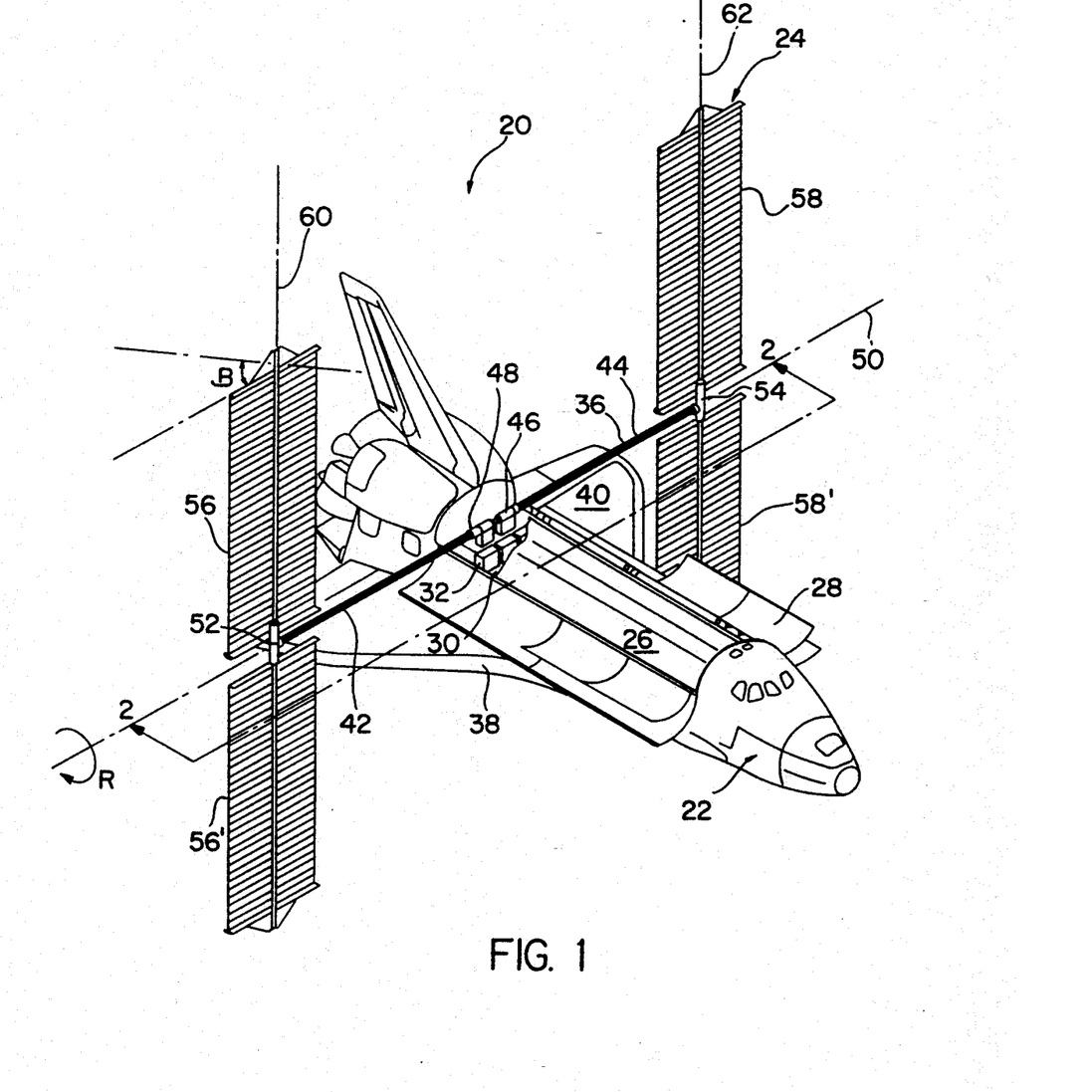
FIG. 1 shows an isometric view of an Orbiter with the solar power system deployed.

FIG. 1 illustrates a perspective view of solar powered space vehicle 20 which includes Orbiter 22 and solar power system 24. The Orbiter includes payload bay 26 which in FIG. 1 is viewable due to payload doors 28 being in an open state. Solar power system 24 features support structure 30 preferably positioned at the aft end of payload bay 26. Storage batteries 32 are shown to be supported by support structure 30. Boom 36 is also supported by support structure 30. Boom 36, in the extended state, extends past both the starboard wing 38 and port side wing 40 of Orbiter 22.

In a preferred embodiment, boom 36 is comprised of boom section 42 and boom section 44. The inner end of boom sections 42 and 44 are secured within boom canisters 46,48. The inner ends of boom sections 42 and 44 are retained within boom canisters 46,48 and boom sections 42 and 44 are adapted for alpha rotation about the alpha axis 50. A pitch drive motor (M, FIG. 5) or motors provides means for rotating boom sections 42 and 44 about alpha axis 50 as depicted by the rotation arrow designated "R".

At the free or outside ends of boom sections 42 and 44 there is provided securement means 52 and 54. Securement means 52 and 54 are preferably in the form of beta angle hinges which allow for the pivoting of solar panel arrays 56, 56' and 58, 58' about beta axis 60 and 62, respectively. Beta angle hinges 52 and 54 provide for the articulation of solar arrays 56, 56' and 58, 58' through angle B. Preferably, the beta angle hinges allow for articulation of up to ±65°. As shown in FIG. 1, beta axis 60 and 62 extend perpendicular to alpha axis 50 and in the same direction of deployment for the solar panel arrays discussed in more detail further below.

Figure 2:
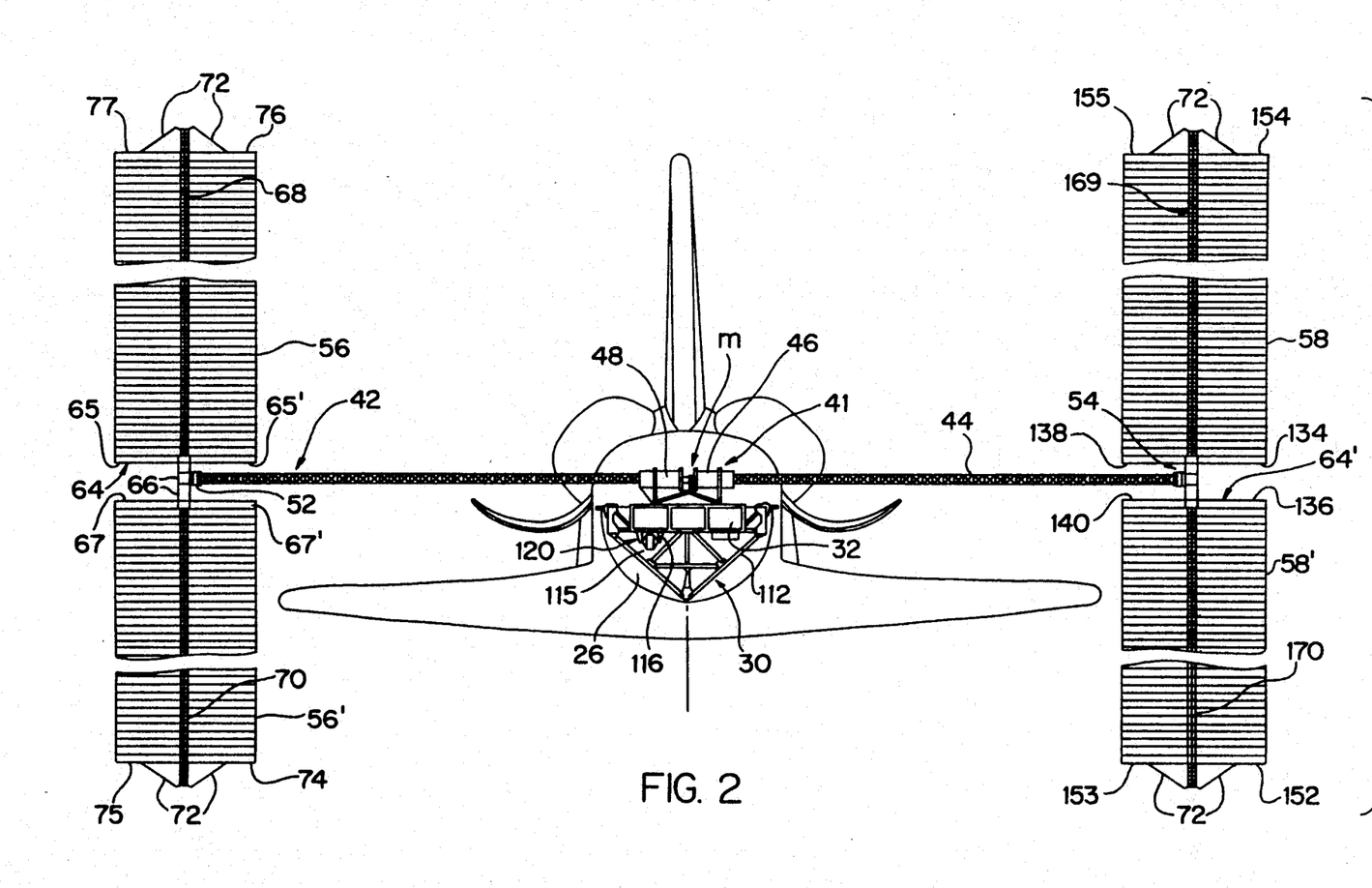
FIG. 2 shows an cross-sectional view taken in the Y-Z plane at the position of the boom.

FIG. 2 shows beta angle hinge 52, secured to foldable casing assembly 64 which comprises mast canister 66, an upper pair of array casings 65, 65' and a lower pair of array casings 67, 67'. Extending out from opposite sides of mast canister 66 are masts 68 and 70 having lines 72 joining the masts to heading strips 74, 75, 76 and 77 of the solar panel arrays 56, 56'. The opposite side of the solar power system 24 features a second casing assembly 64' which is the same as casing assembly 64.

FIG. 2 also illustrates deploy-stowage assembly 41 which comprises boom sections 42 and 44 formed of a girder-like structure and boom canisters 46 and 48 from which boom sections 42 and 44 extend. Boom sections 42 and 44 are designed to extend along the y-y or alpha axis during deployment and are retained within canister 46 and 48 during stowage. Preferably, boom sections 42 and 44 are telescopic in nature so as to achieve the extension and retraction along the y-y axis. The length of boom sections 42 and 44 is such that each of the solar panels arrays inside edge is placed away from the lateral tips of the Orbiter's wings 38 and 40. A length of about 15 meters for each boom section when in an extended state would therefore be suitable. Panels 56, 56', 58 and 58' have the same maximum extension length which, in a preferred embodiment, is about 19 meters above and below boom sections 42 and 44.

FIG. 2 further illustrates support structure 30 which features a triangular truss structure 112. Positioned on support structure 112 are a plurality of batteries 32. Support structure 30 also provides support for momentum wheel system 120 which includes momentum wheel 115 supported by bearing brackets 116. Momentum wheel 115 is driven by any suitable motor and energy to drive the motor is provided by batteries 32.

Figure 5:
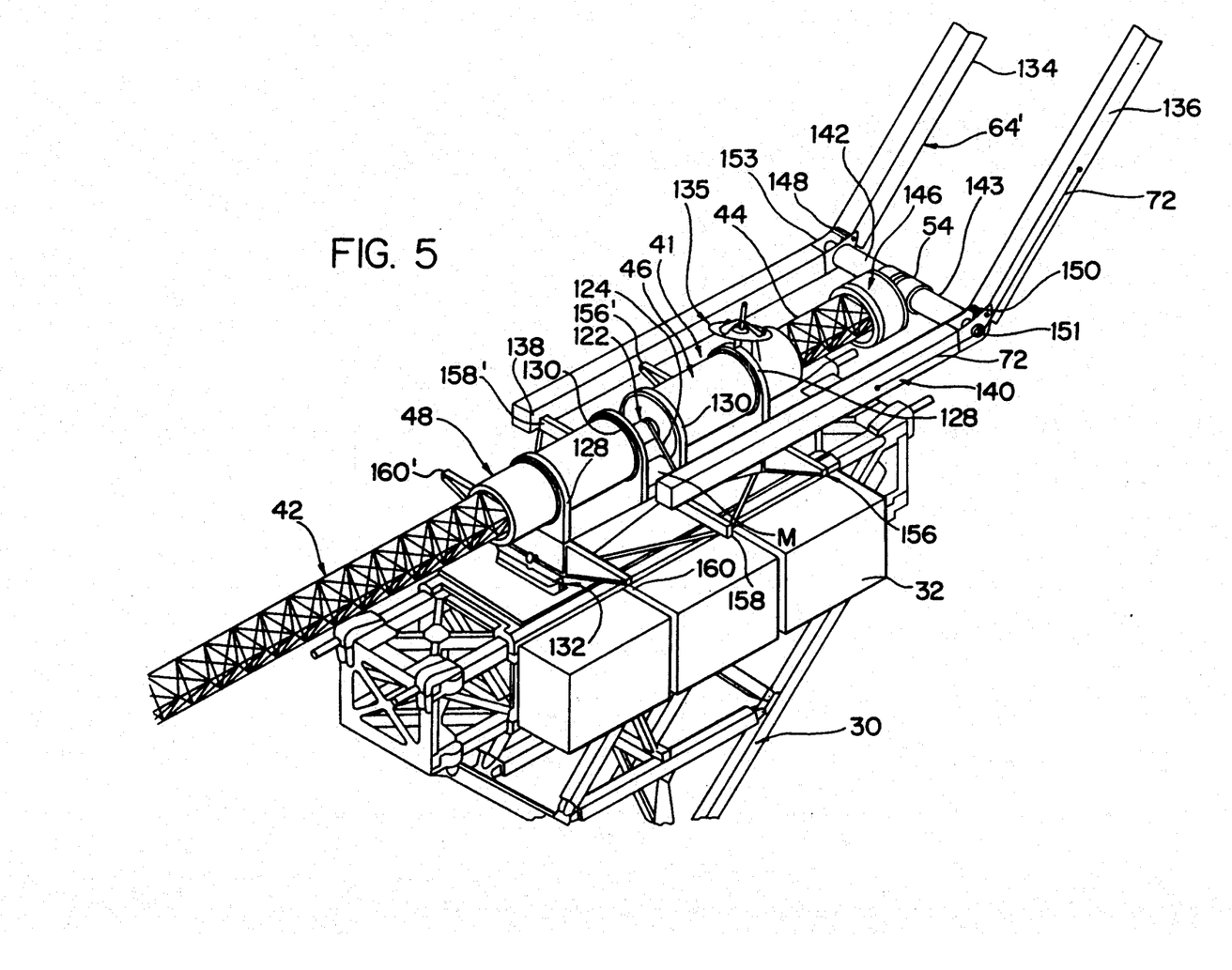
FIG. 5 shows in greater detail the stowage and deployment assembly of the present invention.

FIG. 5 shows in greater detail deploy-stowage assembly 41, support structure 30, and casing assembly 64'. As shown in FIG. 5, deploy-stowage assembly 41 includes boom canisters 46 and 48 and torque tube 122. Articulated booms 42 and 44 deploy from canisters 48 and 46 via motor-driven nuts within the canisters. As each boom segment leaves the canister, diagonal latches engage, resulting in a light-weight structural member. Booms 42 and 44 are subsequently deployed. Boom canisters 46 and 48 are retained within bearing supports 128 and 130 such that reversible motor M and gear train 124 are free to rotate the boom section ±360°. Motor M, preferably a three phase redundant stepper motor, drives gear train 124 and torque tube 122, rotating boom section 42 and 44 about the alpha axis.

Bearing supports 128 and 130 are secured to jettison interface 132 such that the entire deploy-stowage assembly 41, boom sections 42, 44 and solar panels casings and panels can be jettisoned away from the payload bay should there be a stowage malfunction which cannot be readily repaired and which would interfere with Orbiter payload bay door closing.

Referring again to FIG. 5, deploy-stowage assembly 41 further includes grapple fixture 135. The purpose of this RMS connection point is to allow complete removal from the cargo bay and installation on the Space Station or any orbiting platform. Also, casing assembly 64' is shown to include a first pair of foldable casings 134, 138 and a second pair of foldable casings 136, 140. Mast canisters 142 and 143 extend between the two pairs of casings and connect one pair to the other pair. The array casings 134, 136 and 138, 140 are initially stowed in the folded position. A stepper motor is used to actuate rotation of casing 134 and 136 relative to 138 and 140 as shown in FIG. 5. This rotation is terminated when the rotating casing becomes latched as shown. Beta angle hinge 54 is joined to the free end of boom section 44. The mast canister portions 142, 143 extend transversely through clasping member 146 forming part of beta angle hinge 54. The canisters swing down to the level of the lower pair 138 and 140. Each of canisters 142, 143 include a cylindrical rotating deployment nut member 148, 150. Caps 151 and 153 forming the end of masts 169, 170 (FIG. 2) are connected with linking struts 72. The other end of linking struts 72 is secured to one of heading bars 152-155 (FIG. 2). Thus, upon extension of masts 169, 170 the folded or coiled solar panels are drawn out of their casings such as shown in FIG. 2 into an extended state. This deployment is effected in a staged manner. Initially the uppermost section (approximately 1 meter) of mast 169, 170 is deployed. As struts 72 become loaded the bars 152-155 are engaged to the mast an interim pickup location. Deployment then continues to termination.

As shown in FIG. 5, support structure 30 includes stowage support bar pairs 156, 156'; 158, 158' and 160, 160'. Stowage support bar pairs extend to opposite sides of boom canisters 46 and 48 to provide support to casings 134, 136, 138 and 140 when they are in stowage position. Such a stowage position features casings 138 and 140 lying directly in contact with support bar pairs 156, 156' and 158, 158'. Outer casing pair 134, 136 are positioned so as to lie flush with casings 138 and 140 positioned below. Launch restraint mechanisms are integral to the support bars. These mechanisms are released prior to deployment. The mechanisms may be reversed to allow the secure restowage of the array casings to allow Orbiter return.

When the solar panels are to be deployed, boom section 44 is extended outwardly along the y-axis until clear of the side of the Orbiter. Then, the pivoting means 148, 150 are activated to rotate casings 134, 136 about the x-axis outwardly from the flush position to a position where casings 134 and 136 are in an H-shaped arrangement with respect to casings 138, 140 and canisters portions 142 and 143. Boom section 44 is then extended outwardly along the y-axis until clear of the side of the Orbiter. Once the H-shaped casing arrangement is clear of the Orbiter's sides, motor M rotates the H-shaped frame (if necessary) so as to place the solar panels, when extended, essentially perpendicular to the sun's rays. If the sun is positioned to one side of the z-axis of the Orbiter, beta angle adjustments are made to place the solar panels in the maximum solar collection position. The same activity and adjustments occur with respect to the other casing assembly 64 positioned on the starboard side either simultaneously or sequentially. Alternatively, the panels can be deployed and then the H-shaped frame can be placed in proper orientation.

Figure 9:
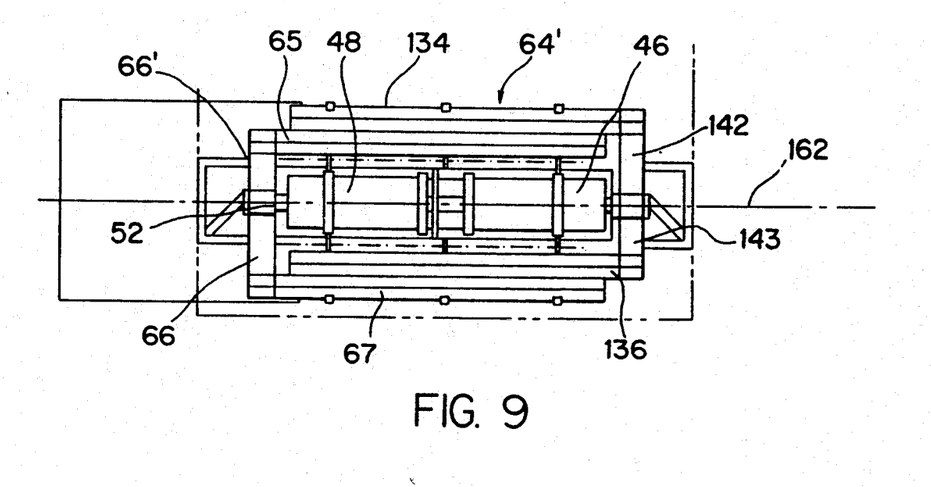
FIG. 9 shows a planar view of the stowage and deployment center of the present invention.

FIG. 9 illustrates a planar view of starboard casing assembly 64 and port side casing assembly 64' in a stowage position on the support bars 156, 156', 158, 158', 160 and 160' (FIG. 5). As can be seen from FIG. 9, casing assemblies 64 and 64' are offset laterally from one another. Hence, both casing assembly 64 and 64' share support bar pairs 156, 156', 158, 158' and 160, 160'. The offset arrangement between casing assemblies 64 and 64' is achieved by forming one of each pair of mast canister portions longer than the other. For instance, as shown in FIG. 9 mast canister portion 142 is longer than 143 and mast canister portion 66 is longer than 67 so as to achieve the nesting arrangement shown in FIG. 9. With this arrangement it is possible to have centerline 162 coaligned with the central axis of boom sections 42, 44 and shaft 122 whereby rotation of drive gear train 124 carries the same rotation in both the starboard and port panel arrays.

Figure 10:
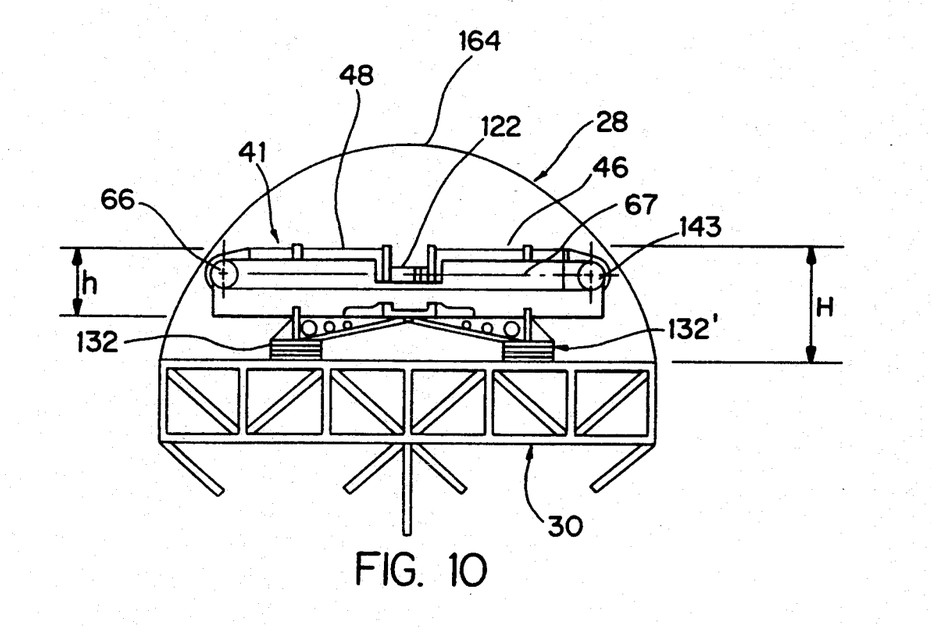
FIG. 10 shows an elevational front view of the stowage and deployment assembly in a stowage mode as well as a portion of the support structure.

FIG. 10 illustrates an elevational view of casing assemblies 64 and 64' in stowage position. As shown in FIG. 10, each casing in casing assemblies 64 and 64' lies in a common plane flush with the underlying support. Further, the nesting arrangement shown in FIG. 9 provides for a compact lateral arrangement. This compact lateral and low height arrangement makes the stowage-deploy assembly 41 compact enough to fit within the limited space defined by a portion of the payload bay of the Orbiter generally designated 164.

FIG. 10 further illustrates both jettison assemblies 132 and 132' secured to support structure 130 which is secured to the interior of the Orbiter defining the rear end of payload bay 26. The stowage-deploy assembly of the present invention could be disposed at various other locations within the payload bay. However, the passage tunnel extending from the front of the Orbiter to within the front of the payload bay and the positioning of the lab or cargo (e.g., microgravity lab in the middle area of the payload bay) makes it advantageous for positioning the stowage-deploy assembly 41 in the rearward most portion of the payload bay. The present invention, with its deployment only along the alpha axis, is particularly useful in avoiding entanglement with other components positioned forward of the stowage-deploy assembly.

Figure 3:
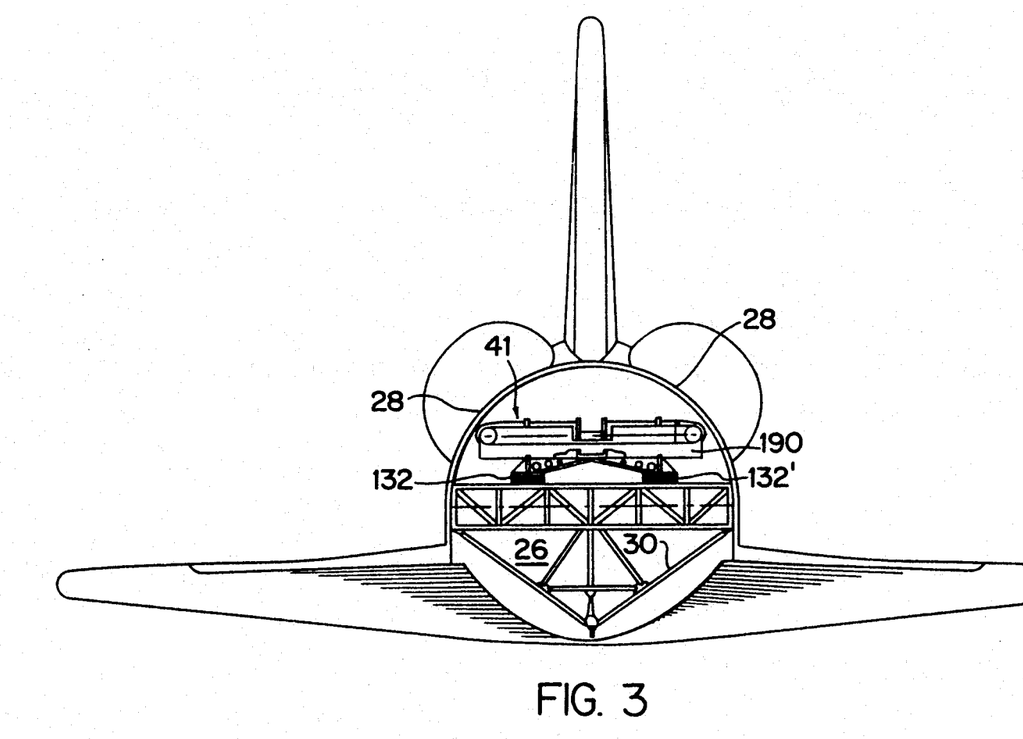
FIG. 3 shows the same view as that in FIG. 2 except for the solar arrays being stowed within the Orbiter's payload bay.

FIG. 3 illustrates a cross-sectional view of the Orbiter's payload bay 26 with support structure 30 retained therein. As shown in FIG. 3, stowage-deploy assembly 41 extends laterally to just inside of payload doors 28 which open outwardly at the time of deployment. FIG. 3 further illustrates that stowage-deploy assembly 41 is compact from a height standpoint. In fact, framework 190 supported by jettison supports 132, 132' is positioned about mid height with respect to the upper half of the circular cross-sectional payload bay. Therefore, nested casing assemblies 64 and 64' (which are about 12 inches in thickness) extend for a total of about 26.5 inches above the upper planar surface of framework 190. This arrangement ensures sufficient clearance with respect to the opened payload bay doors 128 while avoiding any requirement for lifting or raising stowage-deploy assembly 41 when the solar panels are being deployed. This not only avoids added, unneeded structural elements, but also helps in avoiding degradation of low microgravity conditions.

Figure 6:
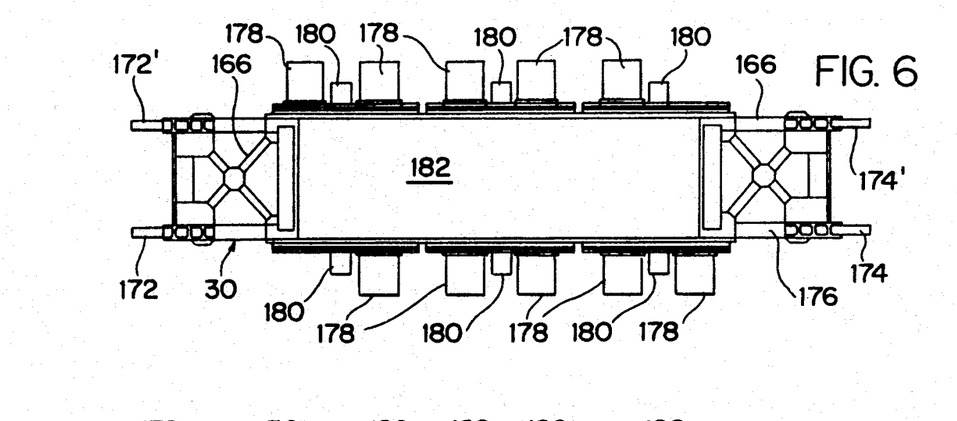
FIG. 6 shows a planar view of the support structure for the solar panel system of the present invention.
Figure 7:
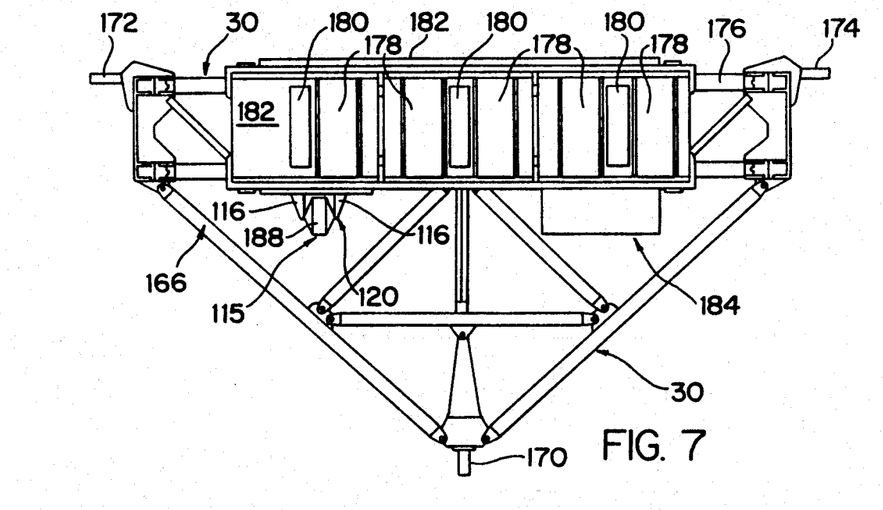
FIG. 7 shows a front view of the support structure for the solar panel system of the present invention.
Figure 8:
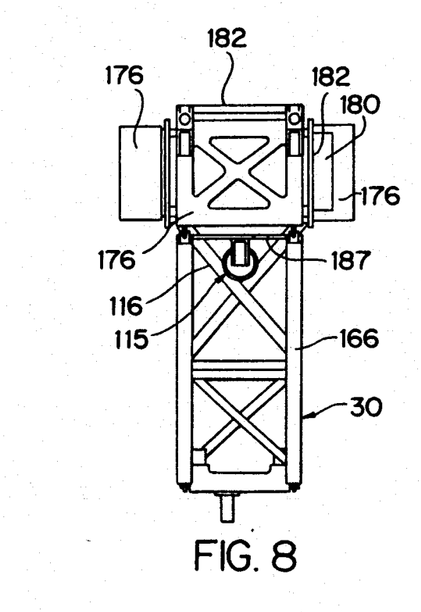
FIG. 8 shows a side view of the support structure shown in FIGS. 6 and 7.

FIG. 6-8 illustrate support structure 30 in greater detail. FIG. 7 shows an elevational front view of support structure 30. As shown in FIG. 7, support structure 30 includes a truss structure generally designated 166. Truss structure 166 includes protrusions 170, 170', 172, 172', 174, and 174' which are joined to the interior surface of the Orbiter so as to fix support structure in position within the payload bay. Protrusions 172, 172', 174 and 174' extend from truss section 176 which supports a plurality of batteries 178 (10 shown). Truss section 176 further supports control boxes 180.

Attached to the upper surface of truss section 176 is cold plate assembly 182 which is three sided in cross-section and forms the base for stowage-deploy assembly 41 and the supporting means for Freon pump package 184 and momentum wheel system 120. Cold plate assembly 182 in conjunction with Freon pump package 184 helps in dissipating heat conducted through the boom sections to the interior components of the stowage-deploy assembly 41.

Bearing brackets 116 support momentum wheel 115 which is driven by a suitable motor (not shown). The reaction wheel negates changes in momentum brought about by the driving of pitch motor M and boom sections 42, 44 or minor cyclic pitch excursions in the Orbiter so as to maintain the desired Orbiter attitude and avoid undesirable changes in the microgravity environment.

Figure 4:
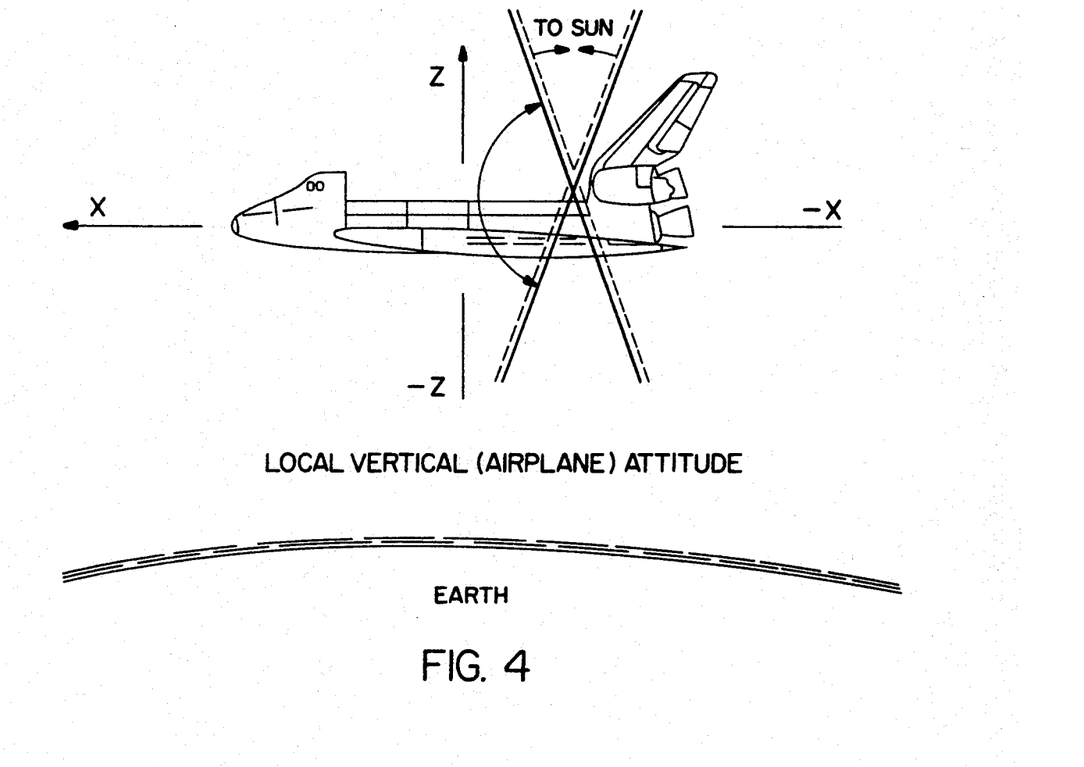
FIG. 4 shows a side view of the Orbiter travelling in a local vertical attitude, as well as alpha axis rotation of the solar arrays.
Figure 11:
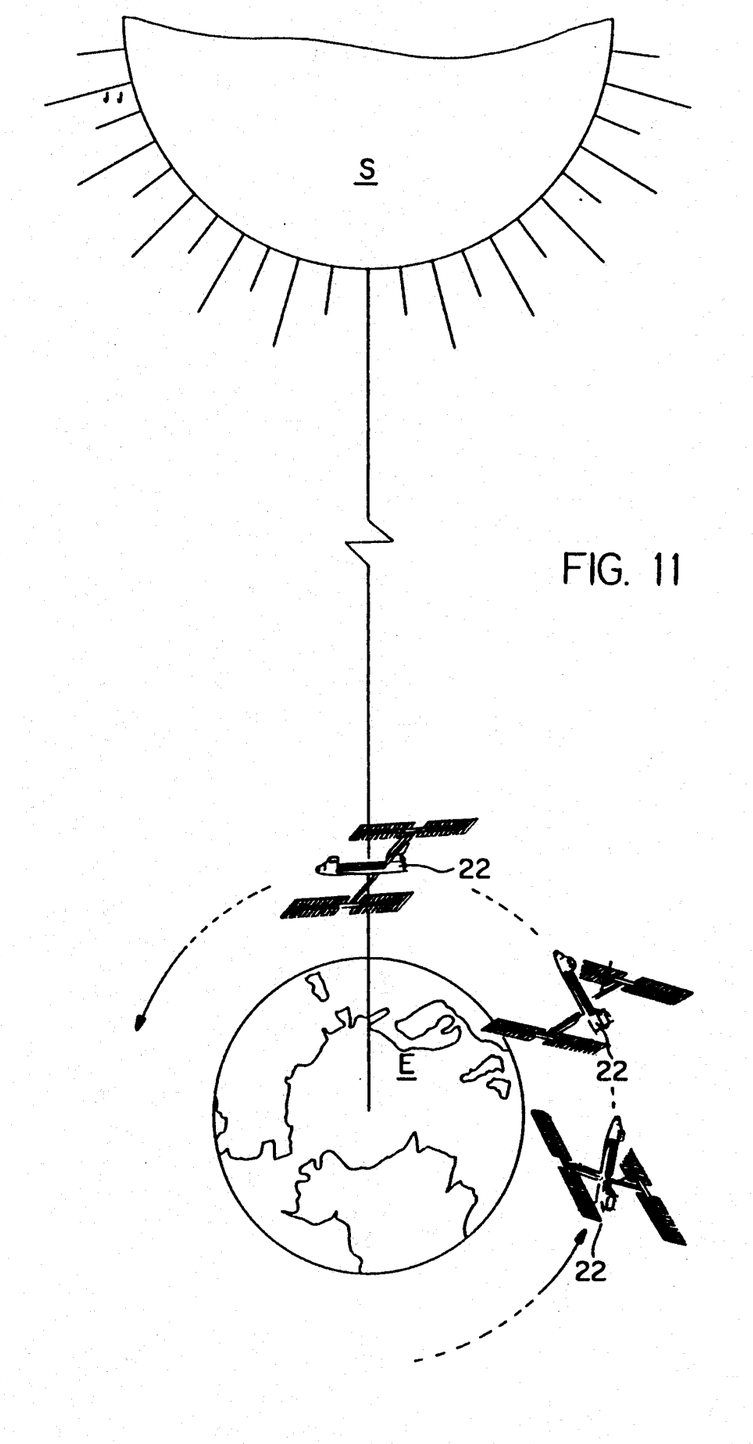
FIG. 11 shows the Orbiter in a local vertical attitude orbiting about the earth and the fixed inertial position by the panels with respect to the sun.

FIG. 4 illustrates a side view of Orbiter 22 in a local vertical attitude and with the solar panels deployed. By driving pitch motor M (FIG. 5) it is possible to place the panels in rotation so as to directly face the sun while the Orbiter pitches. FIG. 11 provides a perspective, sequenced view of Orbiter 22 while travelling on the sun lit portion of the orbit. The solar panel arrays, generally designated 56 and 58, are inertially fixed in the maximum solar collection position while varying in pitch with respect to the x,y,z reference frame of the Orbiter 22 as Orbiter 22 orbits about the earth in a local vertical attitude.

FIG. 11 also illustrates the belly of Orbiter 22 closest to the earth such that the +Z axis extends down towards the earth. By utilizing its thrusters it is possible for the Orbiter to achieve a relatively constant 0.067°/sec downward pitch such that Orbiter 22 retains a local vertical attitude at its typical flying altitudes. In other words, the Orbiter is shown to be orientated such that its relationship to a plum line or a line drawn from the center of the earth directly outward is always the same. The present invention enables Orbiter 22 to have its x-z axis always remaining in the plane of the orbit, in any convenient local vertical attitude. Convenient choices include payload bay towards either the Zenith or the Nadir and the Orbiter nose parallel to or opposite to the direction or velocity. These four attitude options all permit a space lab module to have all the experiment rack locations within ±1 meter vertically of the Orbiter center of gravity CG. This ability to position the experiment rack locations so close to the center of gravity minimizes gravity gradient forces and torques which could degrade experiments.

The aforementioned local vertical attitudes also permits other experiment operations to conveniently view either the stars (astronomy, astrophysics) with the payload bay towards the Zenith or the earth (earth resources, atmosphere physics, etc.) with the payload bay towards the Nadir while also having the solar panels positioned in an optimum position for collection of solar energy. Moreover, the aforementioned local vertical attitudes all have minimum atmospheric drag and provide a very good microgravity environment for life sciences and for material processing experimentation.

Figure 12:
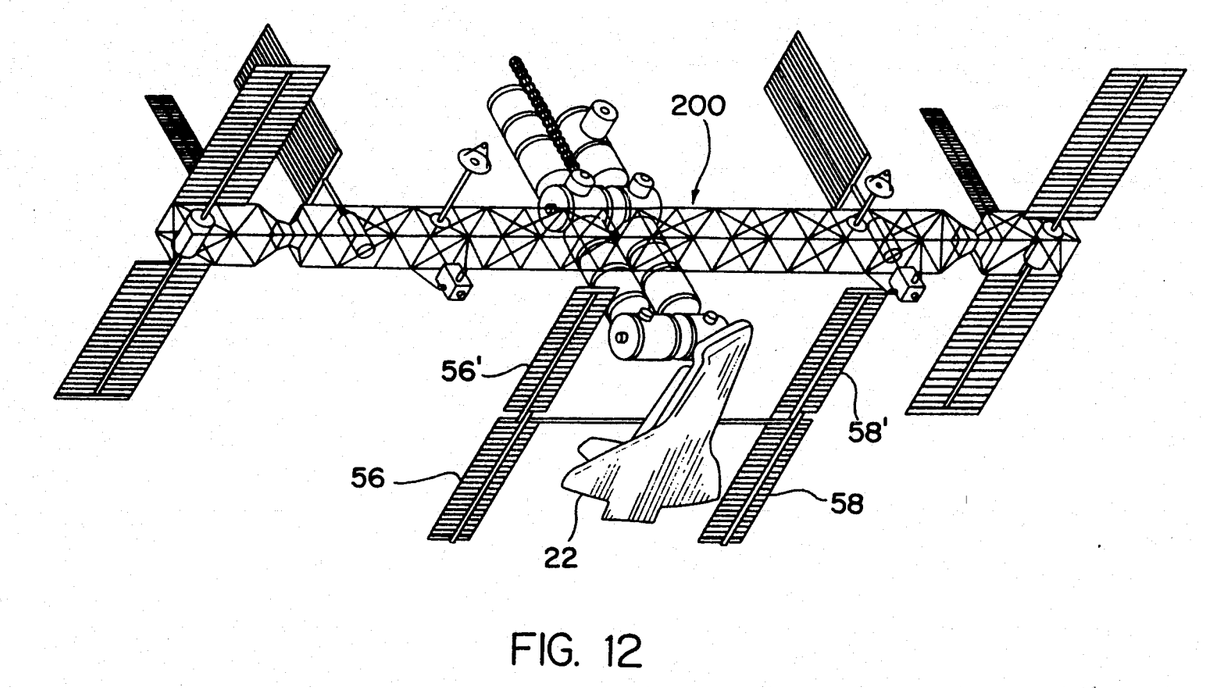
FIG. 12 shows Orbiter 22 docked with a Space Station with its solar power system deployed.

FIG. 12 illustrates Orbiter 22 docked with respect to space station 200. Panel arrays 56, 56' and 58, 58' are operational while Orbiter 22 is docked at its top front docking location. Panels 56, 56' and 58, 58' are partially deployed (each extended about 80% of their maximum length) to ensure against contact with the space station while Orbiter 22 is docked to the space station.

As can be seen by FIG. 12, the rearward positioning and compact nature of the stowage-deploy assembly (41, FIG. 5) is particularly advantageous in achieving Orbiter docking with space station 200.

Figure 13:
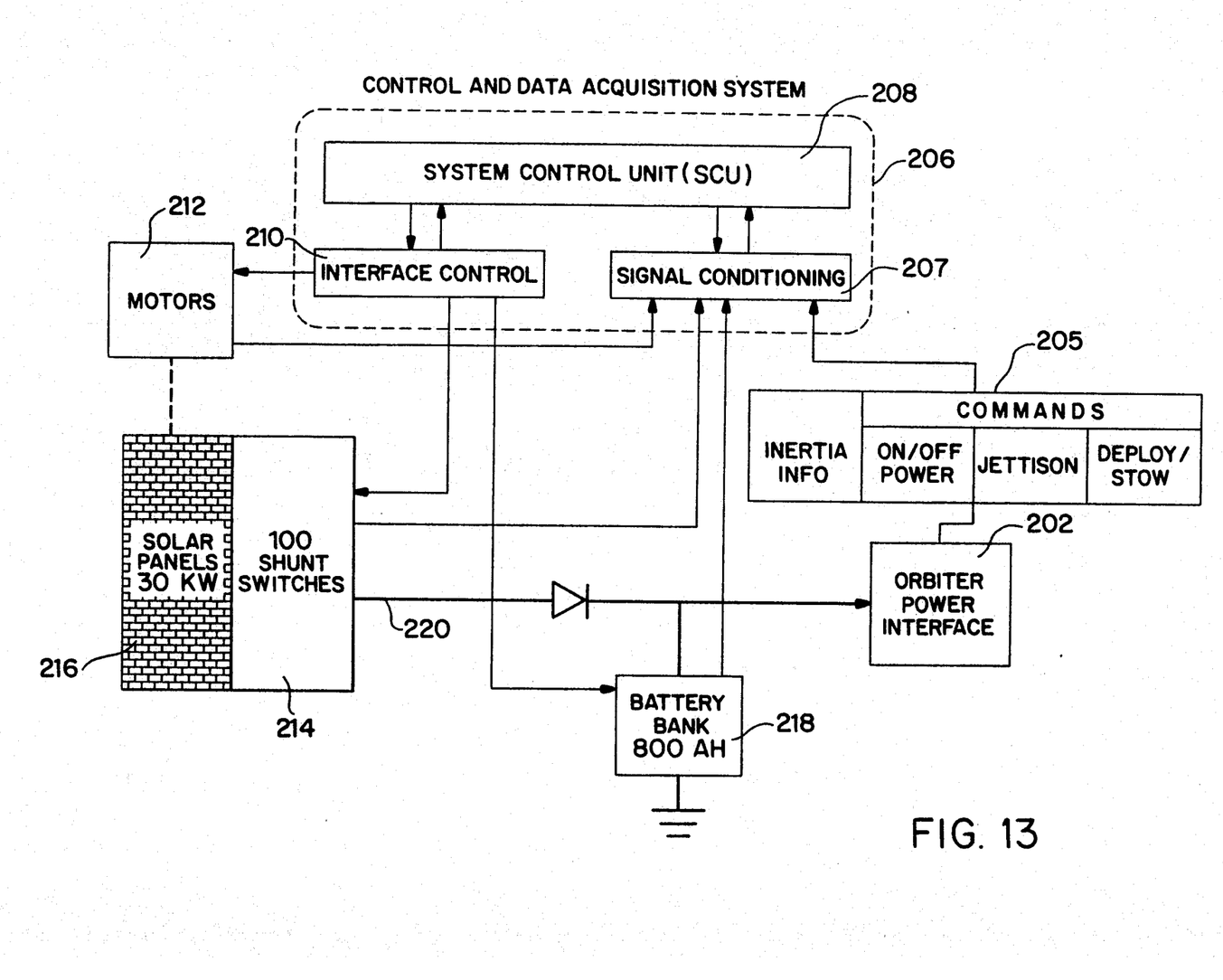
FIG. 13 shows a block diagram of the control and electrical circuitry of the present invention.

FIG. 13 provides a block diagram of the redundant power generation and storage system. This is an illustration of the control means and electrical circuitry 205 of the present invention while interfacing with the control means and electrical circuitry of Orbiter 22. Control means 205 includes an Orbiter Power Interface 202 which monitors signals received from both the solar power system (24, FIG. 1) and the Orbiter. Interface 202 outputs signals to control assembly 206. Control assembly 206 includes a signal conditioning unit 207 which receives signals from interface unit 202, battery bank system 210, various driving motors 212, and a plurality of shunt switches 214 in line with solar panels 216.

Signal conditioning unit 207 is in communication with system control unit 208 which, in turn, is in communication with interface control unit 210. Interface control unit 210 issues signals to motors 212, switches 214, and battery bank 218. Motors 212 include: pitch drive motor M, array box tie down, 180° array box articulation, beta gimbal, and primary and secondary mast deployment motors. FIG. 13 also illustrates main power line 220 in electrical communication with solar panels 216, battery bank 218 and Orbiter power interface 202. Thus, the Orbiter can be powered directly from the panels at about 18 kW and, while at a maximum collection state, about 12 kW is directed to battery bank 218. Battery bank 218 can be relied upon for powering the Orbiter at 18 kW during the dark side of the Orbiter or for emergency use when solar panels 216 are not functioning or are destroyed.

In a preferred embodiment, the extendable and retractable boom sections 42 and 44 and solar array masts 68, 70 are automatically deployable booms such as the "Continuous-Longeron Boom" or the "Articulated-Longeron Boom" manufactured by AEC-ABLE Engineering Company, Inc. of Goleta, Calif. In addition, boom section 42 and 44 as well as solar array masts 68, 70 can take the form of the "FASTMast" system also manufactured by AEC-ABLE Engineering Company, Inc. The FAST Mast is a latchless, articulated, four-longeron (vertical members) mast that can be combined with either a lanyard type or a nut type deployment mechanism for remote deployment/retraction. The mast's design combining both flexible and rigid battens (cross members) eliminates the need for latches. Because the flexible battens are stowed in a strained (bent) configuration, they produce the strain energy that internally preloads the mast; thus eliminating joint slop for loads smaller than the preload.

Figure 14:
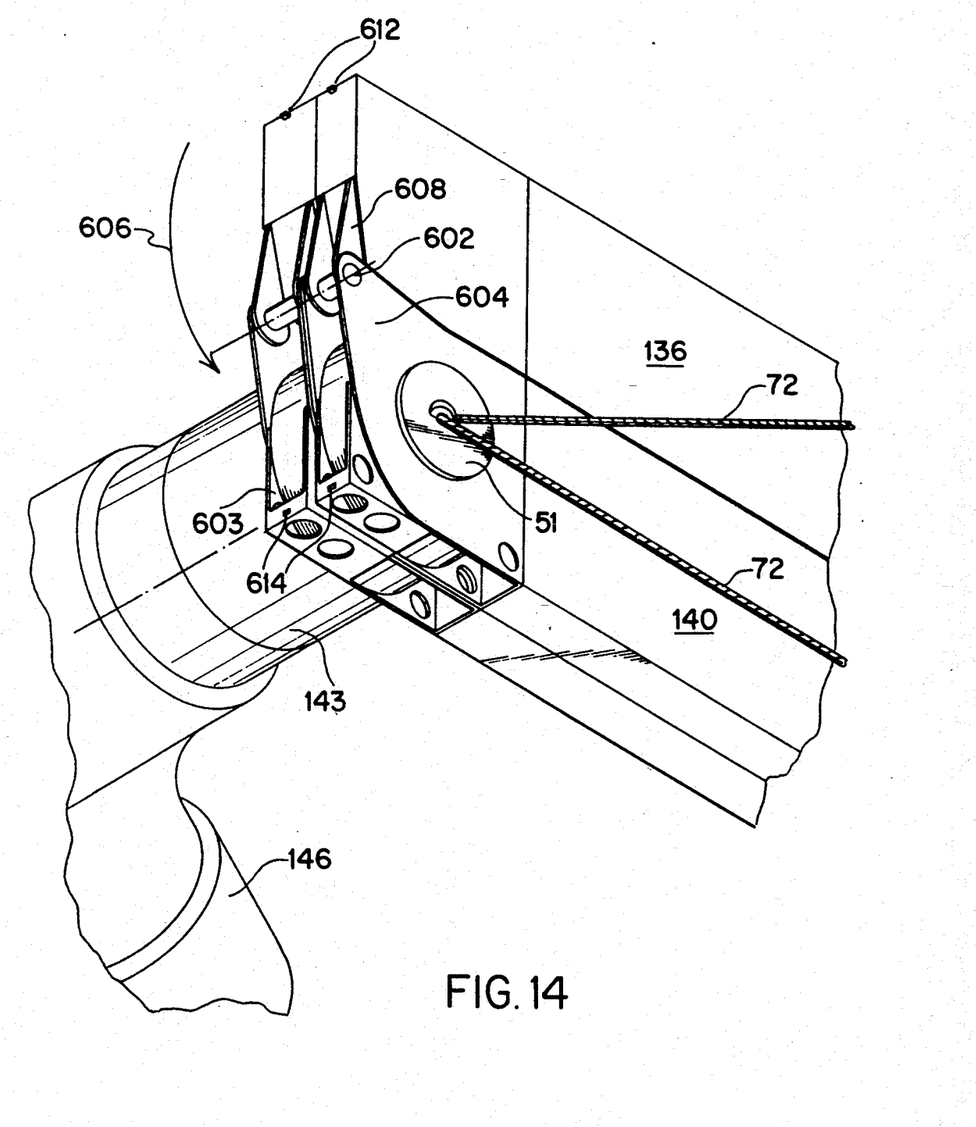
FIG. 14 shows the pivotable relationship between a pair of solar array casings.

FIG. 14 shows in greater detail the pivotable relationship between solar array casing 136 and 140. As shown in FIG. 14, top positioned casing 136 is pivotably connected at hinge 602 for rotation about extended end section 604 of lower casing 140. casing 140 is secured to mast canister portion 143 (which is secured to clasping member 146 of boom section 44) by flange segments 603. During deployment upper casing 136 is rotated about hinge 602 in the direction shown by arrow 606. Any conventional pivoting means can be relied upon but the preferred embodiment features a powered hinge assembly (e.g. motor with gears) which pivots hinge 602 about its central axis and the bearing surface provided in casing 140 while casing 136 is fixedly attached at extensions 608 to hinge 602. Lines 72 are pivotably connected to end-cap 51 of extendable mast 170. following a 180 degree rotation of casing 136, locking clasps 612 are locked within apertures 614 to temporarily fix the casings in deployed position. Mast 170 is then extended so as to place lines 72 and to draw out the solar panels which are folded in accordion-like fashion within the casing. Alternatively, the solar panels arrays can be withdrawn from a coiled state in window shade fashion.

What is claimed is:

1. A solar power system for use with a space vehicle in orbit, the space vehicle having a payload bay and, for reference, a ±X axis extending in the direction of orbit, a ±Y axis extending to opposite sides of the payload bay and perpendicular to the ±X axis, a ±Z axis extending perpendicular to said ±X and ±Y axes and through the payload bay, and, when in orbit, the X-Z plane of the space vehicle coincides with the orbital plane of the space vehicle, comprising:

a support structure fixed within the payload bay of the space vehicle;

a boom;

means for extending and retracting said boom along the ±Y axis;

rotation means for rotating said boom about the ±Y axis;

means for attaching said boom to said support structure, and said attachment means and support structure being dimensioned and arranged such that said boom has a z-axis level during stowage within the payload bay which is the same as the z-axis level of said boom when said boom is being extended and retracted by said extending and retracting means; and solar panels supported by said boom.

2. A solar power system as recited in claim 1, wherein said boom includes a first boom section with an inboard end, said first boom section being adapted for extension by said extension and retraction means out away from one side of said support structure, and a second boom section with an inboard end which is adapted for extension by said extension and retraction means out away from an opposite side of said support structure, said first and second boom sections being attached to said attachment means, and said rotation means including drive means to rotate the inboard ends of said boom sections.

3. A solar power system as recited in claim 2, further comprising first and second boom canisters and said rotation means including a shaft connected to and extending between said boom canisters, said first boom section adapted for stowage within said first boom canister, said second boom section adapted for stowage within said second boom canister, and wherein said first and second boom sections share a common central axis with said shaft.

4. A solar power system as recited in claim 3, wherein said rotation means rotates said shaft such that said first and second boom sections rotate synchronously about the ±Y axis.

5. A solar power system as recited in claim 1, further comprising storage means for storing said solar panels in a storage state; deployment-retraction means for drawing said solar panels from said storage means and for retracting said solar panels into said storage means; said boom including first and second boom sections extending to opposite sides of said support structure; and said power system further comprising securement means for securing said storage means to an external end of said first and second boom sections.

6. A solar power system as recited in claim 5, wherein said securement means comprises first and second beta angle hinges connected to said solar panel storage means and wherein said first beta angle hinge is connected to the external end of said first boom section and said second beta angle hinge is connected to the external end of said second boom section, said storage means including first and second casing assemblies with each casing assembly having a first pair of casings pivotably joined to one another and a second pair of casings pivotably joined to one another, said casing assemblies further including a mast canister extending between said first and second pairs of casings in a respective one of said casing assemblies, and said mast canisters being joined to said beta angle hinges.

7. A solar power system as recited in claim 6, wherein the casings in said first pair of casings are adapted for folding one upon another and for pivoting away from one another so as to further extend along the ±Y axis, and wherein the casings in said second pair of casings are adapted for folding one upon another and for pivoting away from one another so as to further extend along the ±Y axis.

8. A solar power system as recited in claim 7, wherein said mast canister of said first casing assembly includes a first portion extending to one side of said first beta angle hinge and a second portion extending on the opposite side of said first beta angle hinge and said first portion extending further away than said second portion, and said mast canister of said second casing assembly having a first portion extending to one side of said second beta angle hinge and a second portion extending to the opposite side, and said second portion extending further out away from said second beta angle hinge than said first portion such that each pair of casings in said first casing assembly is laterally offset from each pair of casings in said second casing assembly whereby the casings in said casing assemblies, when in a stowage position, extend past one another in a direction along the ±Y axis.

9. A solar power system as recited in claim 6, further comprising electrical lines extending along said first and second boom sections and electrically connected to said solar panels, said beta angle hinges having about (±65°) pivot range, and said electrical line including a flex cable extending past said beta angle hinge.

10. A solar power system as recited in claim 1, further comprising a momentum wheel assembly having a momentum wheel adapted for rotation about an axis parallel to the ±Y axis.

11. A solar power system as recited in claim 1, wherein said means for attachment attaches said boom to said support structure so as to be non-rotatable about the z-axis whereby there is avoided only development of a moment about the z-axis due to said boom either before or during an extension or retraction of said boom along the ±Y axis.

12. A solar power system for use with a space vehicle in orbit, the space vehicle having, for reference, a ±X axis extending forward to aft, a ±Y axis extending port to starboard; a ±Z axis extending above and below the space vehicle, and, when in orbit, the X-Z plane of the space vehicle coincides with the orbital plane of the space vehicle, said solar power system comprising:

an extendable and retractable boom which, when extended, extends to port and starboard along the ±Y axis of the space vehicle;

a first beta angle hinge connected to a first external end of said boom and a second beta angle hinge connected to a second external end of said boom;

support means joined to the space vehicle for supporting said boom;

means for attaching said boom to said support means;

means for rotating said boom about the ±Y axis;

means for extending said boom from a retracted position to the extended position;

solar panels;

solar panel storage means for storing said solar panels, said storage means including a first casing assembly secured to said first beta angle hinge and a second casing assembly secured to said second beta angle hinge, said first casing assembly including a first pair of solar panel casings and a pivot joint pivotably connecting said first pair of solar panel casings such that a casing in said first pair is foldable onto the other casing in that pair and adapted for pivoting at the pivot joint about an axis parallel to the ±X axis so as to extend along the direction of the ±Y axis, and said second casing assembly including a first pair of solar panel casings and a pivot joint pivotably connecting said first pair of solar panel casings such that a casing in the pair is foldable onto the other casing in that pair and is adapted for pivoting at the pivot joint about an axis parallel to the ±X axis so as to extend along in the direction of the −Y axis, and said first casing assembly including a second pair of solar panel casings pivotably joined and a mast canister secured to said first beta angle hinge and extending between said first and second pairs of casings in said first casing assembly, and said second casing assembly including a second pair of solar panel casings and a mast canister secured to said second beta angle hinge and positioned between said first and second pairs of casings in said second casing assembly.

13. A solar power system as recited in claim 12, wherein said mast canisters include a first and a second portion and said first portion of a first of said mast canisters is longer than the first portion of a second of said mast canisters and the second portion of said first mast canister is shorter than the second portion of said second mast canister such that the pairs of casings in said first casing assembly are laterally offset from the pairs casings in said second casing assembly so that said casings in said first casing assembly overlap along the Y axis with the casings in said second casing assembly when said casing assemblies are in a stowage mode.

14. A solar power system as recited in claim 12, further comprising a momentum wheel assembly supported by said supporting means, said momentum wheel assembly including a momentum wheel adapted for pivoting about an axis parallel to the ±Y axis.

15. A solar power system for use with a space vehicle, comprising:
a support base;
an extendable boom positioned within a payload bay of the space vehicle while in a stowage mode;
attachment means for attaching said boom to said support base;
rotation means for rotating said boom about an alpha axis extending longitudinally along said boom;
extension means for extending said boom out away from said support base along the alpha axis;
solar panels;
solar panel storage means for storing said solar panels;
securement means for securing said storage means to said extendable boom;
means for deploying and retracting said solar panels away from and into said storage means;
said securement means including beta angle hinges for pivoting said solar panels about a beta axis which beta axis extends essentially perpendicular to the alpha axis of said boom and in a direction essentially parallel with the direction said solar panels are extended by said deploying and retracting means; and
said storage means including pairs of solar panel casings wherein each casing in a pair is joined by a pivot joint to the other casing in that pair, and means for unfolding one of the casings in each pair outwardly along the alpha axis, and wherein said first and second beta angle hinges are secured to respective external ends of said boom, and said storage means includes a first mast canister extending between two of said pairs of jointed casings and secured to said first beta angle hinge and a second mast canister extending between an additional two of said pairs of jointed casings and secured to said second beta angle hinge.

16. A solar panel system as recited in claim 15, wherein, for reference, a z-axis extends perpendicular to said alpha axis and beta axis, and wherein said support base and said attachment means are dimensioned and arranged such that said boom has a z-axis level during the stowage mode which is the same as the z-axis level of said boom when said boom is being extended and retracted.

17. A solar power system as recited in claim 15, further comprising a momentum wheel assembly supported by said support structure, said momentum wheel including a momentum wheel adapted to pivot about an axis parallel to the alpha axis.

18. A solar power system as recited in claim 15, wherein said attachment means includes means for jettisoning said boom out of the payload bay, and said means for jettisoning including means for releasing said boom from attachment with said support base such that payload doors of the payload bay are closeable following the jettisoning of said boom out of the payload bay.

19. A solar power system as recited in claim 15, wherein said support structure includes a cold plate positioned below said attachment means and said solar power system further comprising means for cooling said cold plate.

20. A solar power system as recited in claim 19 further comprising a plurality of batteries supported by said support structure and in contact with said cold plate.

21. A solar power system as recited in claim 15 comprising a redundant power system comprised of solar cells, a shunting unit to control the use of the power from the solar cells, a battery bank comprised of multiple cell stacks, and a control and data acquisition computer to manage solar tracking, battery charging, and battery bank power levels.

22. A method of providing solar power to a space vehicle in orbit, comprising:
extending a retracted first boom section to one side of the space vehicle along an alpha axis;
extending a retracted second boom section to the opposite side of the space vehicle along the alpha axis;
pivoting a first of a first pair of solar panel casings joined to said first boom section out further away from the space vehicle along the alpha axis;
pivoting a first of a second pair of solar panel casings joined to said second boom section out further away from the space vehicle along the alpha axis; and
deploying said solar panels from said solar casings in a direction transverse to the alpha axis;
synchronously rotating said boom sections about the alpha axis so as to rotate said panels to track the sun; and
derotating said first and second boom sections on a dark side portion of the orbit such that flex cables extending along said first and second boom sections are unwound.

23. A method as recited in claim 22, further comprising the step of retaining said boom sections at the same height with respect to the space vehicle when said boom sections are in stowage and when said boom sections are being extended.

24. A method as recited in claim 22, further comprising rotating said solar panel casings about a beta angle hinge connected at the external ends of said first and second boom sections.

25. A method as recited in claim 22, further comprising rotating said solar panel casings about a beta angle hinge connected at the external ends of said first and second boom sections.

26. A method as recited in claim 22, further comprising rotating a momentum wheel to negate momentum created by rotation of said boom sections.

27. A method as recited in claim 22, wherein said step of deploying said solar panels includes maintaining the center of gravity of said solar powered space vehicle at essentially the same place during solar panel stowage and solar power operation through symmetrical deployment of said solar power panels from a support base which is fixed at the same height during deployment and stowage.

28. A method for providing solar power derived from the sun to an orbiting space vehicle, which, for reference, has a $\pm X$ axis extending forward to aft, a $\pm Y$ axis extending port to starboard, a $\pm Z$ axis extending above and below the space vehicle, and when in orbit, the X-Z plane of the space vehicle coincides with the orbital plane of the space vehicle, comprising:

placing said space vehicle in essentially a local vertical attitude and maintaining said space vehicle in essentially the local vertical attitude by pitching said space vehicle at essentially a constant pitch rate;

deploying boom sections which extend in the $\pm Y$ direction, and then solar panels in a direction perpendicular to the direction of extension of the boom sections;

fixing, in solar inertial coordinates, the deployed solar panels positioned at the end of the boom sections, while said space vehicle orbits about the sunlit side of the orbit, by rotating said boom sections about the $\pm Y$ axis in a first direction opposite to the pitch rotation and at essentially the same rate as the pitch rotation;

rotating said boom sections in a direction opposite to said first direction during a dark side portion of the orbit so as to unwind electric cables extending along said boom sections;

accelerating a momentum wheel to negate any change in momentum which develops during rotation of said boom sections in said first direction, during rotation of said boom sections in said second direction, and to stabilize and control any minor cyclic pitch excursions of the space vehicle.

29. A solar power system for use with a space vehicle having a payload bay comprising:

a support structure fixed within the payload bay of the space vehicle;

a boom;

means for extending and retracting said boom along an alpha axis extending to the sides of the payload bay;

rotation means for rotating said boom about the alpha axis;

means for attaching said boom to said support structure;

solar panels;

storage means for storing said solar panels in a storage state;

deployment-retraction means for drawing said solar panels from said storage means and for retracting said solar panels into said storage means; said boom including first and second boom sections extending to opposite sides of said support structure; and said power system further comprising securement means for securing said storage means to an external end of said first and second boom sections, said securement means comprising first and second beta angle hinges connected to said solar panel storage means and wherein said first beta angle hinge is connected to the external end of said first boom section and said second beta angle hinge is connected to the external end of said second boom section, said storage means including first and second casing assemblies with each casing assembly having a first pair of casings pivotably joined to one another and a second pair of casings pivotably joined to one another, said casing assemblies further including a mast canister extending between said first and second pairs of casings in a respective one of said casing assemblies, and said mast canisters being joined to said beta angle hinges.

* * * * *